(12) United States Patent
Keller et al.

(10) Patent No.: US 7,497,286 B2
(45) Date of Patent: Mar. 3, 2009

(54) AUXILIARY ELECTRIC DRIVE ASSEMBLY

(75) Inventors: Robert F. Keller, Chesterfield, MI (US); Sathya Vaidyanathan, Troy, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 11/193,824

(22) Filed: Jul. 29, 2005

(65) Prior Publication Data

US 2007/0023211 A1 Feb. 1, 2007

(51) Int. Cl.
*B60K 1/00* (2006.01)
(52) U.S. Cl. ................... 180/65.6; 180/65.2
(58) Field of Classification Search ............ 180/65.7, 180/65.6, 65.2, 65.1; 903/918, 926, 940; 475/150, 221, 342; 477/5
See application file for complete search history.

(56) References Cited

U.S. PATENT DOCUMENTS

| | | | | |
|---|---|---|---|---|
| 5,443,130 A | * | 8/1995 | Tanaka et al. | 180/65.6 |
| 5,497,070 A | | 3/1996 | Furutani et al. | |
| 5,620,387 A | * | 4/1997 | Janiszewski | 475/150 |
| 5,718,300 A | * | 2/1998 | Frost | 180/65.1 |
| 5,823,280 A | * | 10/1998 | Lateur et al. | 180/65.2 |
| 6,059,064 A | * | 5/2000 | Nagano et al. | 180/65.4 |
| 6,083,138 A | * | 7/2000 | Aoyama et al. | 477/5 |
| 6,119,799 A | * | 9/2000 | Morisawa et al. | 180/65.2 |
| 6,378,638 B1 | * | 4/2002 | Mizon et al. | 180/65.6 |
| 6,401,850 B1 | | 6/2002 | Bowen | |
| 6,481,519 B1 | * | 11/2002 | Bowen | 180/65.6 |
| 6,484,834 B2 | | 11/2002 | Bowen et al. | |
| 6,499,549 B2 | | 12/2002 | Mizon et al. | |
| 6,595,308 B2 | * | 7/2003 | Bowen | 180/65.6 |
| 6,604,591 B2 | | 8/2003 | Bowen et al. | |
| 6,656,082 B1 | * | 12/2003 | Yamada et al. | 180/65.2 |
| 6,864,607 B2 | | 3/2005 | Hashimoto | |
| 6,935,451 B2 | | 8/2005 | Bell et al. | |
| 2002/0061801 A1 | | 5/2002 | Amanuma et al. | |
| 2003/0037976 A1 | | 2/2003 | Bowen et al. | |
| 2003/0054910 A1 | | 3/2003 | Nett | |
| 2005/0104198 A1 | | 5/2005 | Sowul et al. | |
| 2005/0109549 A1 | | 5/2005 | Morrow | |

FOREIGN PATENT DOCUMENTS

WO  WO 02/072376  9/2002

* cited by examiner

*Primary Examiner*—Hau V Phan
(74) *Attorney, Agent, or Firm*—Brinks Hofer Gilson & Lione

(57) ABSTRACT

An auxiliary electric drive assembly includes an alternating current induction motor, planetary speed reduction gearing and a differential. The differential may be either active or passive. The auxiliary drive system is utilized as the front axle in a rear wheel drive vehicle and the rear axle in a front wheel drive vehicle. Elimination of many of the components in a conventional four wheel drive system such as the transfer case and hybrid gears improves the overall efficiency and fuel economy of a vehicle so equipped.

18 Claims, 7 Drawing Sheets

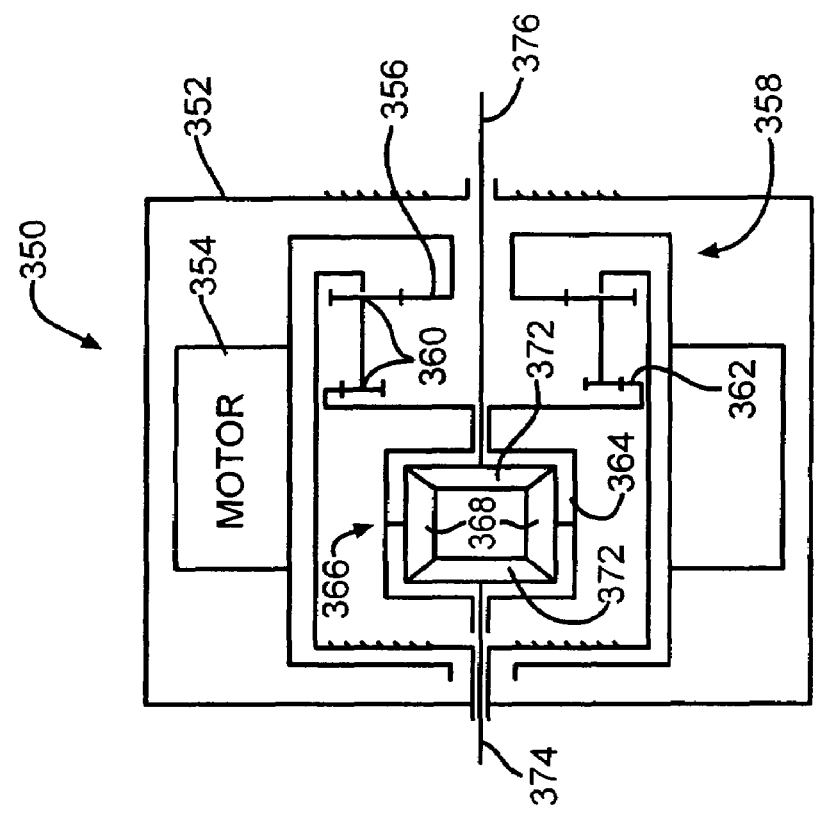
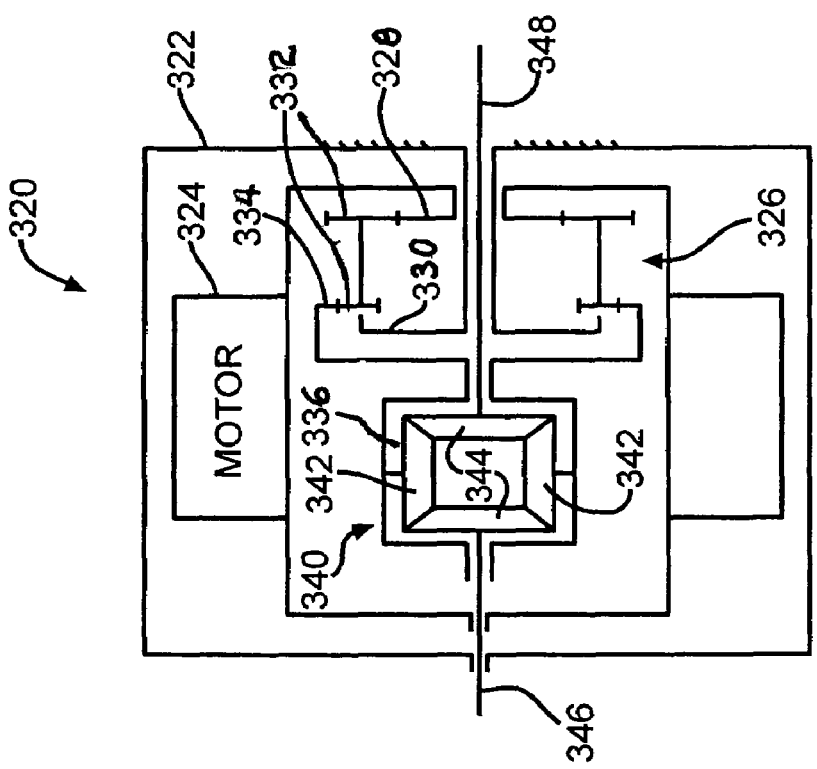

US 7,497,286 B2

AUXILIARY ELECTRIC DRIVE ASSEMBLY

TECHNICAL FIELD

This invention relates generally to auxiliary drive systems for motor vehicles and more specifically to a system which includes an alternating current motor, speed reduction gearing and a differential.

BACKGROUND OF THE INVENTION

The popularity of four wheel drive vehicles continues to drive consumer purchases. At one time, four wheel drive was generally limited to foreign passenger cars and low gear operation in trucks. Adaptive and full time four wheel drive systems are now available across passenger car, truck and SUV markets. Accompanying the expansion of four wheel drive applications has been extensive development of the electronic sensors and controls of such systems. This, too, has furthered the utility and appeal of four wheel drive vehicles.

The features and benefits of four wheel drive vehicles frequently suppress consideration of less positive aspects, particularly the mechanical complexity of such systems, their added weight and thus the negative impact on vehicle fuel economy. The unidirectional trend of fuel costs suggests that mechanical and electronic systems that provide four wheel drive function with reduced complexity and weight is therefore a desirable goal. The present invention is directed to such a vehicle driveline configuration.

SUMMARY

An auxiliary electric drive assembly includes an alternating current induction motor, planetary speed reduction gearing and a differential. The differential may be either active or passive. The auxiliary drive system is utilized as the front axle in a rear wheel drive vehicle or the rear axle in a front wheel drive vehicle. Elimination of many of the components in a conventional four wheel drive system such as the transfer case and hypoid gears improves the overall efficiency and fuel economy of a vehicle so equipped.

Thus it is an object of the present invention to provide an auxiliary drive system including an induction motor, planetary gear speed reduction assembly and a differential.

It is a further object of the present invention to provide such an auxiliary drive system having either an active or passive differential.

It is a still further object of the present invention to provide an auxiliary electric drive system which may be utilized as the front axle in a rear wheel drive vehicle or the rear axle in a front wheel drive vehicle.

It is a still further object of the present invention to provide an auxiliary electric drive system for a motor vehicle having reduced weight and mechanical complexity relative to conventional four wheel drive systems.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIGS. 9A, 9B, 9C and 9D are diagrammatic views of additional embodiments having various planetary gear speed reduction configurations of an auxiliary electric drive system according to the present invention.

DESCRIPTION OF THE PREFFERED AND ALTERNATE EMBODIMENTS

Figure 1:
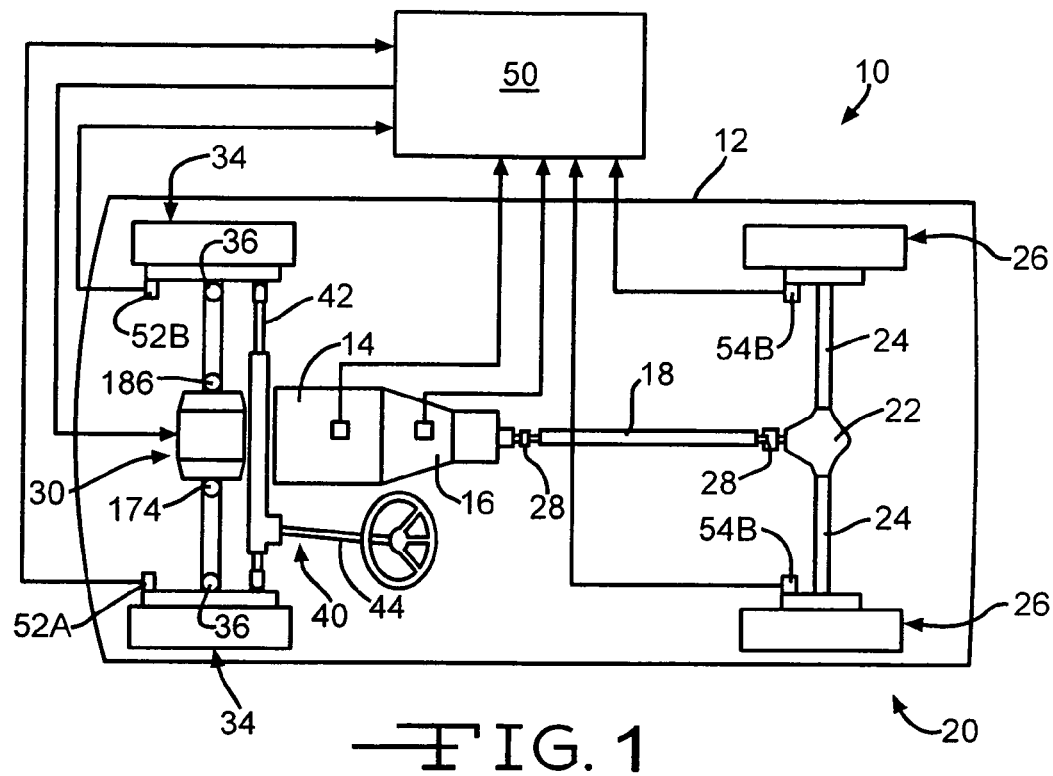
FIG. 1 is a diagrammatic view of a rear wheel drive motor vehicle incorporating the present invention as a front axle drive assembly.

Referring now to FIG. 1, a motor vehicle incorporating the present invention is illustrated and generally designated by the reference number 10. The motor vehicle 10 includes a frame and body 12 which includes and supports a prime mover 14 such as an internal combustion, gas or Diesel engine, hybrid power plant or similar source of power. The output of the prime mover 14 is directly connected to a transmission 16 which may either be an automatic, continuously variable or manual type. The output of the transmission 16 is provided through a prop shaft 18 to a rear axle assembly 20 which includes a differential 22, a pair of half shafts 24 and rear tire and wheel assemblies 26. Suitable universal joints 28 may be incorporated as necessary in order to accept and permit static and dynamic offsets and misalignments of the various shafts and components.

At the front of the vehicle 10 is disposed an auxiliary electric drive assembly 30 according to the present invention. The auxiliary electric drive assembly 30 drives a respective pair of left and right axles 32 which in turn drive left and right front tire and wheel assemblies 34. Suitable constant velocity universal joints 36 may be utilized adjacent the tire and wheel assemblies 34 in a fashion similar to the universal joints 28 to accept and permit static and dynamic misalignments of the components and the shafts at the front of the vehicle 10. Also associated with the front tire and wheel assemblies 34 is a steering assembly 40 which includes a rack and pinion, recirculating ball or other steering mechanism which is coupled by tie rods 42 to the front tire and wheel assemblies 34. A steering column and steering wheel 44 are utilized in accordance with conventional practice to adjust the angle of the front tire and wheel assemblies 34.

A controller or microprocessor 50 receives various signals from various sensors disposed about the vehicle 10 and provides a drive signal such as a high current pulse width modulated (PWM) signal to the auxiliary electric drive assembly 30. For example, front wheel speed sensors 52A and 52B provide information regarding the speeds of the front tire and wheel assemblies 34. Similarly, rear wheel speed sensors 54A and 54B provide information regarding the speeds of the rear tire and wheel assemblies 26 to the microprocessor 50. An engine speed sensor 56 provides information regarding the speed of the engine and a gear selector sensor 58 in the transmission 16 provides information to the microprocessor 50 regarding the current operating gear of the transmission 16. This, as well as information from other sensors such as a throttle position sensor (illustrated in FIG. 2) and a steering angle sensor (also illustrated in FIG. 2) is utilized by the microprocessor 50 to control the auxiliary electric drive assembly 30.

The foregoing description relates to a vehicle which, but for the auxiliary electric drive assembly 30 and associated equipment, is a vehicle conventionally referred to as a rear wheel drive vehicle. It should be appreciated that the auxiliary drive assembly 30 thus provides drive torque to the front tire and wheel assemblies 34 and thus provides performance similar to a four wheel drive vehicle. It should also be appreciated that the auxiliary drive assembly 30 may be disposed at the rear axle of a vehicle conventionally referred to a front wheel drive vehicle to provide the same benefits. This configuration is illustrated in FIG. 2.

Figure 2:
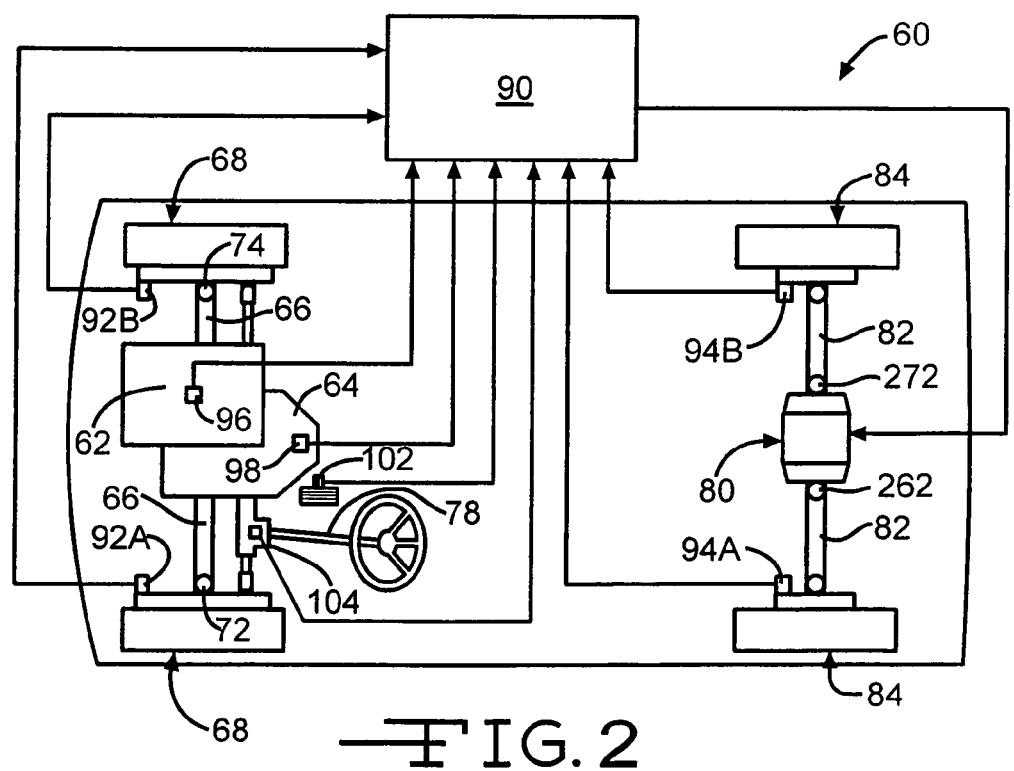
FIG. 2 is a diagrammatic view of a front wheel drive motor vehicle incorporating the present invention as a rear axle drive assembly.

Referring now to FIG. 2, a vehicle conventionally referred to as a front wheel drive vehicle, but for the components of the present invention, is illustrated and generally designated by the reference number 60. The motor vehicle 60 includes a prime mover 62 which may be an internal combustion, Diesel or hybrid power plant. The output of the prime mover 62 is directly coupled to a transaxle 64 which may be either an automatic, continuously variable or manual transmission. The transaxle 64 includes a pair of outputs which are provided to respective front half shafts 66 which in turn are coupled to a pair of front tire and wheel assemblies 68. Suitable constant velocity joints 72 may be utilized in connection with the front drive shafts 66 at the respective tire and wheel assemblies 68. Also associated with the front tire and wheel assemblies 68 is a steering box 74 which may be a recirculating ball or rack and pinion assembly. A pair of tie rods 76 couple the output of the steering box 74 to the front tire and wheel assemblies 68 in a conventional fashion. A steering column and steering wheel 78 provide conventional control over the angular position of the front tire and wheel assemblies 68. At the rear of the vehicle 60 is disposed an auxiliary electric drive assembly 80 having a pair of output shafts 82 which directly drive a pair of rear tire and wheel assemblies 84 through suitable constant velocity joints 86.

A controller or microprocessor 90 receives various signals from various sensors within the vehicle 60 and provides drive signals to the auxiliary drive assembly 80. For example, a pair of front wheel speed sensors 92A and 92B provides information to the microprocessor 90 regarding the speed of the front tire and wheel assembly 68. A similar pair of sensors 94A and 94B associated with the rear tire and wheel assemblies 84 provide signals to the microprocessor 90 regarding the speeds of the rear tire and wheel assemblies 84.

It should be appreciated that individual, i.e., dedicated, wheel speed sensors such as illustrated in FIGS. 1 or 2 may be utilized with the present invention. Alternatively, signals representing the wheels speeds may be supplied, derived or monitored from various vehicle systems such as the vehicle anti-lock brake system (ABS) or a car area network (CAN). Additional sensors such as an engine speed sensor 96 and a transmission gear sensor 98, a throttle position sensor 102 and a steering angle sensor 104 may also be utilized. The microprocessor 90 include various programs, software and subroutines which process data from the sensors and provide drive signals to the auxiliary electric drive assembly 80 to most efficiently utilize its operating characteristics. It should be appreciated that such operating characteristics may be optimized for fuel economy or vehicle performance or it may operate as a compromise of these two, or other, operating characteristics. It should also be appreciated that although the throttle position sensor 102 and the steering angle sensor 104 have been illustrated only in connection with the embodiment of the invention and vehicle configuration presented in FIG. 2, they are equally suitable and may be used with the embodiment of the invention and vehicle configuration presented in FIG. 1.

Figure 3:
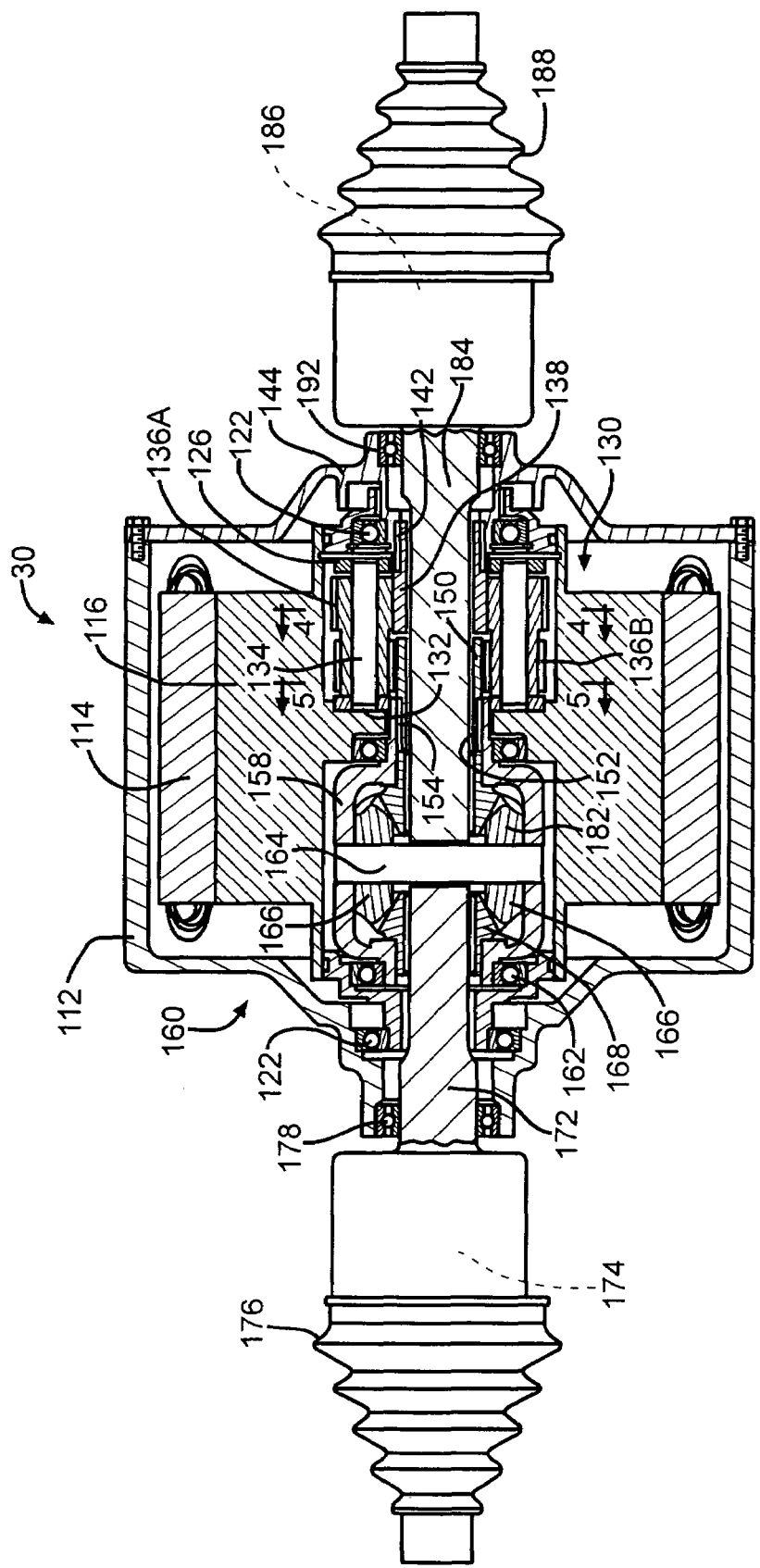
FIG. 3 is a full sectional view of an auxiliary electric drive assembly having an open or passive differential.
Figure 4:
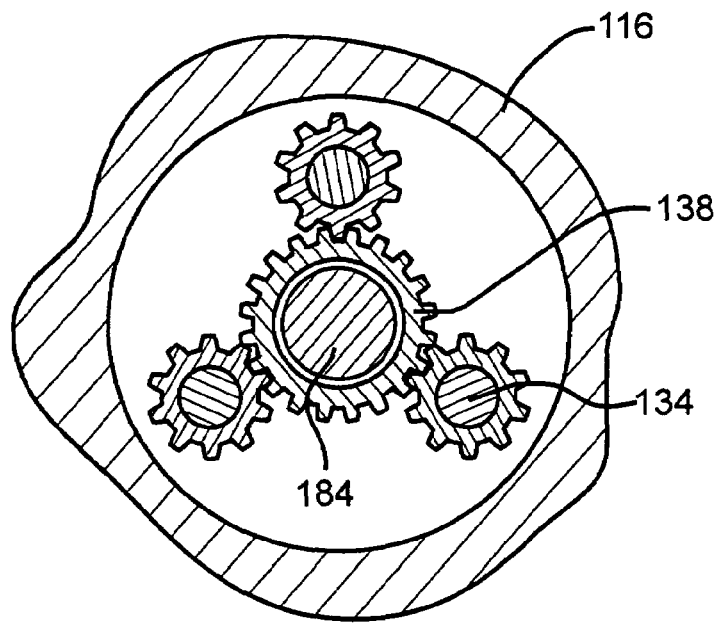
FIG. 4 is an enlarged, full sectional view of the planetary gear assembly of an auxiliary electric drive assembly according to the present invention taken along line 4-4 of FIG. 3.

Referring now to FIGS. 3 and 4, the auxiliary electric drive assembly 30 includes a stationary housing 112 which includes lugs, threaded bores or other mounting features (not illustrated) which facilitate securement of the drive assembly 30 to components of the vehicle 12. The housing 112 supports an alternating current induction motor 114 having a stator 116 and a rotor 118. The rotor 118 is supported within the stator 116 by two ball bearing assemblies 122. The rotor 118 of the induction motor 114 is coupled, at one end, through a flat splined disk 126 to a carrier 128 of a planetary gear speed reduction assembly 130. The other end of the carrier 128 includes face gear teeth or splines 132. The carrier 128 supports a plurality of stub shafts 134 which in turn freely rotatably support paired planet gears 136A and 136B. A plurality of first planet gears 136A mesh with the teeth of a stationary sun gear 138. The sun gear 138 is maintained in position and stationary through a set of inter-engaging splines 142 formed in an end plate 144 of the housing 112.

Figure 5:
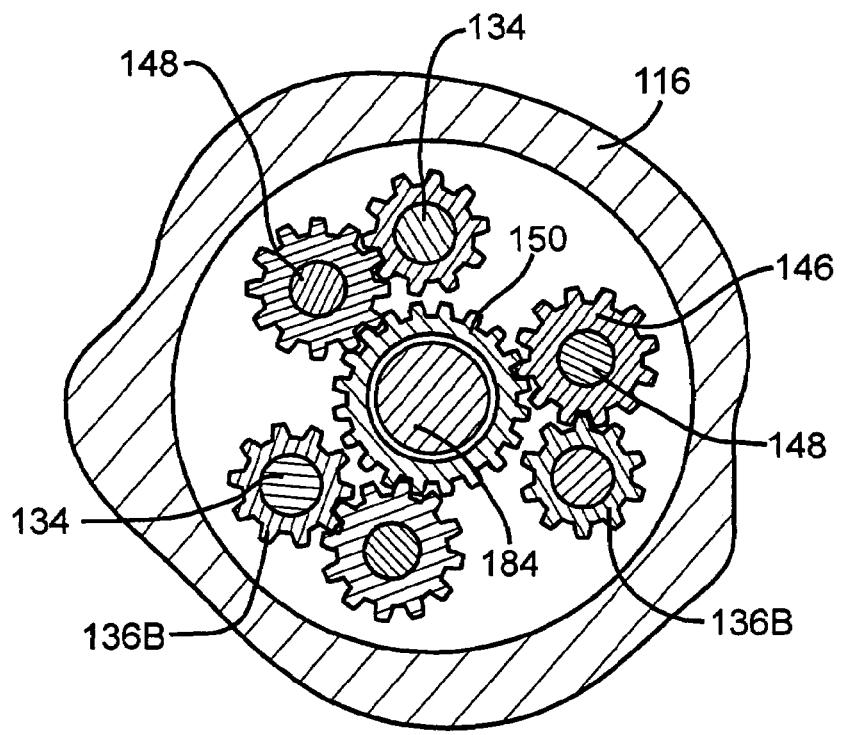
FIG. 5 is an enlarged, full sectional view of the planetary gear assembly of an auxiliary electric drive assembly according to the present invention taken along line 5-5 of FIG. 3.

Referring now to FIGS. 3 and 5, a plurality of second planet gears 136B which are directly coupled to and may be integrally formed with the first planet gears 136A engage larger planet gears 146 which are supported on stub shafts 148 also carried by the carrier 128. The larger planet gears 146 engage a sun gear 150 which acts as the output member of the planetary gear speed reduction assembly 130. The sun gear 150 includes a collar or extension 152 including male splines of an interengaging spline set 154 which drive a cage 158 of a conventional caged differential assembly 160. The differential assembly 160 provides an equal, i.e., 50-50 torque split between its two outputs. The differential cage 158 is freely rotatably supported upon a pair of ball bearing assemblies 162. The caged differential 160 includes a securely retained cross-shaft 164 which receives a pair of freely rotatable idler bevel gears 166. The idler bevel gears 166 both engage a left bevel output gear 168 which is secured to a left output shaft 172. The left output shaft preferably includes a constant velocity U-joint 174 which is contained within a protective flexible boot 176. The left output shaft 174 is rotatably supported by a ball bearing and seal assembly 178. Similarly, a right bevel gear 182 is secured to or drives a right output shaft 184 which extends through the planetary gear assembly 130 and is coupled to a constant velocity universal joint 186 which is protected by a flexible boot 188. The right output shaft 184 is rotatably supported by a ball bearing and seal assembly 192.

In operation, the auxiliary electric drive assembly 30 according to the present is provided, as noted, with a drive signal from the microprocessor 50. This drive signal is generated by software stored within the microprocessor 50 which senses various signals provided by the vehicle sensors and energizes the induction motor 114 in accordance with software operating rules and tables. For example, the induction motor 114 may be energized as a function of throttle position when the throttle position sensor 102 senses throttle position beyond a certain threshold. Similarly, when certain wheel speed differences are detected by the wheel speed sensors, 52A, 52B, 54A and 54B, the induction motor 114 may be energized in accordance with a predetermined routine.

Figure 6:
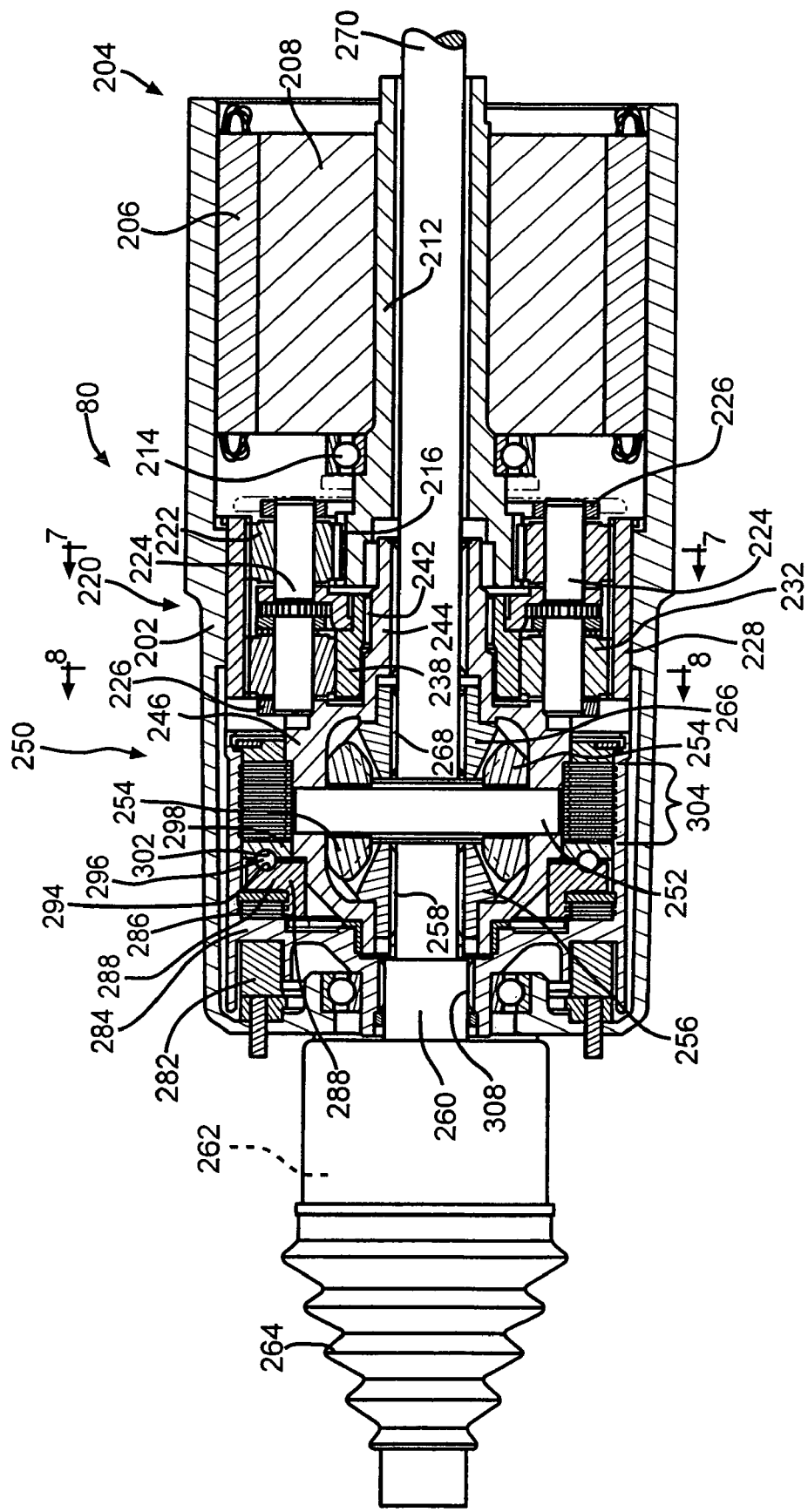
FIG. 6 is a full sectional view of an alternate embodiment electric drive assembly according to the present invention including an active (controllable) differential.
Figure 7:
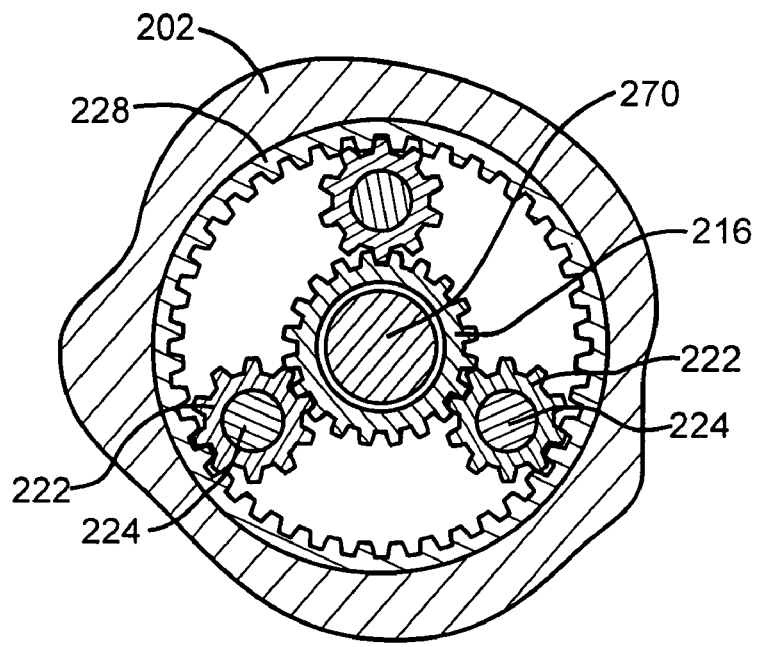
FIG. 7 is an enlarged, full sectional view of the planetary gear assembly of an auxiliary electric drive assembly according to the present invention taken along line 7-7 of FIG. 6.

Referring now to FIGS. 6 and 7, the alternate embodiment auxiliary drive assembly 80 having an active, i.e., controlled or clutched, differential is illustrated and designated by the reference number 80. The auxiliary electric drive assembly 80 includes a housing 202 which locates mounts and protects the various components disposed therewithin. The housing 202 preferably includes lugs or threaded bores (both not illustrated) which facilitate mounting. An alternating current induction motor 204 includes a stator 206 secured to the housing 202 and a rotor 208 which is secured to and rotates with a quill or output shaft 212. The quill or output shaft 212 is supported within the housing upon a ball bearing assembly 214 and carries with it a sun gear 216 which forms a portion of a planetary gear speed reduction assembly 220. The sun gear 216 meshes with a plurality of planet gears 222 which are disposed upon a plurality of stub shafts 224 which, in turn, are supported within and revolve with a carrier 226. The planet gears 222 engage a peripheral ring gear 228. Rotation of the sun gear 226 causes corresponding rotation of the planet gears 222 which are engaged with the stationary ring gear thereby causing rotation of the carrier 226.

Figure 8:
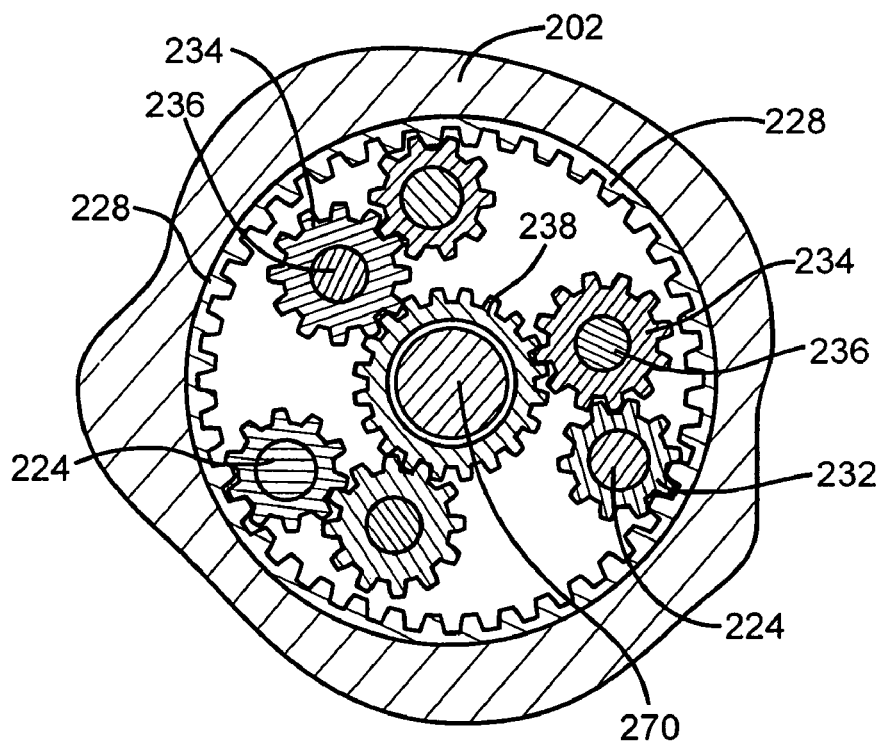
FIG. 8 is an enlarged, full sectional view of the planetary gear assembly of an auxiliary electric drive assembly according to the present invention taken along line 8-8 of FIG. 6.

Referring now to FIGS. 6 and 8, also disposed upon each of the stub shafts 224 are a respective plurality of first smaller planet gears 232 which also engage the ring gear 228. Each of the plurality of first, smaller planet gears 232 also engages a second, larger planet gear 234 disposed upon one of a second plurality of stub shafts 236. The second, larger planet gears 234 engage a sun gear collar 238 having external gear teeth. The sun gear collar 238 also includes female splines of an interengaging spline set 242 formed on an axial extension 244 of a differential cage 246. The differential cage 246 functions as a housing of an active differential assembly 250. The active differential assembly 250 provides an even, i.e., 50-50, torque split. The active differential assembly 250 includes a cross-shaft 252 which is received and secured within the differential cage 246 and mounts and retains a pair of idler bevel gears 254. The pair of idler bevel gears 254 both engage a left bevel output gear 256 which includes a portion of an interengaging spline set 258 which couples the left bevel output gear 256 to a left output stub shaft 260. The left output stub shaft 260 terminates in a constant velocity universal joint 262 which is protected by a flexible elastomeric boot 264.

The pair of idler bevel gears 254 also engage a right bevel output gear 266 having female internal splines which form a portion of an interengaging spline set 268 which couples the right bevel output gear 266 to a right output shaft 270. The right output shaft 270 likewise includes a constant velocity U-joint encased in a protective flexible boot 272, illustrated in FIG. 1.

As noted, the differential assembly 250 is active, i.e., it includes components which facilitate partial or complete locking between the outputs thereby partially or completely inhibiting differentiation. These components include a stationary electromagnetic coil 282 which is secured by suitable means such as threaded studs and fasteners to the housing 202. Energization of the electromagnetic coil 282 retards motion of a cylindrical inner housing 284. A primary or pilot friction clutch pack 286 is operably disposed between the cylindrical inner housing 284 and a circular clutch plate 288. The circular clutch plate 288 is rotationally axially supported by a thrust bearing 292. The face of the circular clutch plate 288 includes a plurality of actuate ramped recesses 294 which each receive a load transferring member such as a ball bearing 296. A clutch apply plate 298 includes a corresponding plurality of ramped recesses 302. As the circular clutch plate 294 and the clutch apply plate 298 rotate relative to one another, the load transferring balls 296 ride up the ramped recesses 294 and 302 thereby applying force to, and compressing, a secondary or main friction clutch pack assembly 304. Within the secondary friction clutch pack assembly 304, a first plurality of friction plates are splined to the cylindrical inner housing 284 and a second, interleaved plurality of clutch plates are splined to the differential cage 246. The cylindrical inner housing 284 is, in turn, coupled through an interengaging set of splines 308 to the left output shaft 260. Accordingly, as the secondary friction clutch pack 304 is compressed, it increasingly couples the left output shaft 260 to the differential cage or housing 246 thereby inhibiting differentiation. Supplying maximum electrical current to the electromagnetic coil 282 causes maximum compression of the friction clutch pack assembly 304, fully inhibits differentiation by the differential assembly 250 and drives the left and right output shafts 260 and 270 at a common speed.

The operation of the alternate embodiment auxiliary electric drive assembly 80 is similar to that of the auxiliary electric drive assembly 30 except that it additionally has the capability of partially or completely inhibiting differentiation by the differential assembly 250 thereby restricting or preventing relative rotation between the output shafts 260 and 270. Thus, the microprocessor 90, in addition to having software and an output which drives the induction motor 204, also includes software and an output which drives, energizes and engages the electromagnetic coil 282. Operation of the induction motor has been described above. The differential assembly 250 may be partially of fully locked when, for example, an excessive wheel speed difference is sensed across its outputs by the wheel speed sensors 94A and 94B. Alternatively, a signal to ensure that differentiation will be possible, i.e., an unlock signal, may be generated by the microprocessor 90 when the steering angle sensor 104 detects that the vehicle is being turned Referring now to FIGS. 9A, 9B, 9C and 9D, the auxiliary electric drive assembly according to the present invention is illustrated with various planetary gear speed reduction configurations. Specifically, referring to FIG. 9A, an auxiliary drive assembly 320 is illustrated having a stationary housing 322 and a stationary motor 324 which drives a planetary gear speed reduction assembly 326 through a sun gear 328. A stationary carrier 330 supports a plurality of planet gears 332 and a ring gear 334 drives the cage 336 of a conventional cage differential assembly 340. The cage differential assembly 340 includes idler bevel gears 342 and side bevel gears 344 which drive left and right outputs 346 and 348 respectively.

Referring now to FIG. 9B, an additional embodiment of an auxiliary electric drive assembly 350 according to the present invention is illustrated and includes a stationary housing 352 which supports a stationary electric motor 354 such as an alternating current induction motor having an output which drives a sun gear 356 of a planetary gear assembly 358. The sun gear 356, in turn, drives a plurality of interconnected planet gears 360 which drive a ring gear 362. The ring gear 362 drives a cage 364 of a standard caged differential assembly 366. The caged differential assembly 366 includes idler bevel gears 368 which cooperatively drive side bevel gears 372 which, in turn, drive respective left and right output shafts 374 and 376.

Figure 9D:
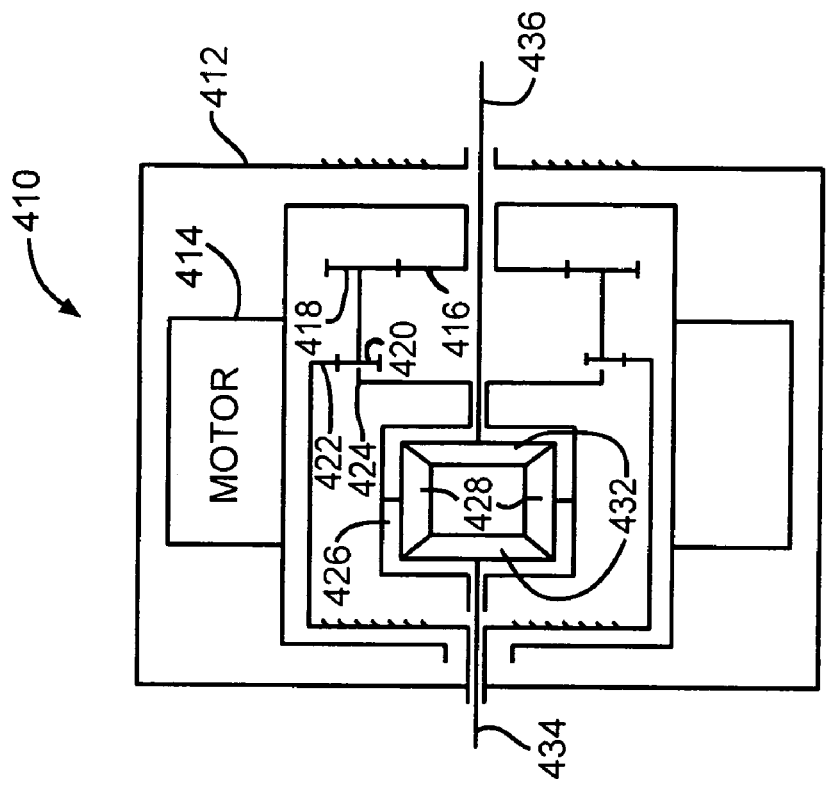
Figure 9C:
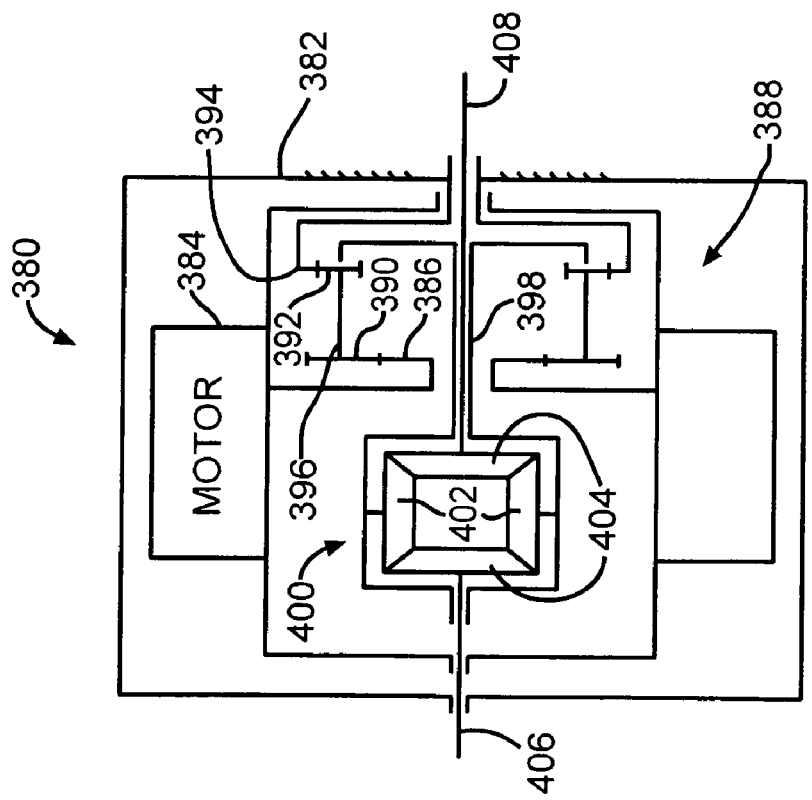

Turning now to FIG. 9C, an additional embodiment of an auxiliary electric drive assembly 380 according to the present invention is illustrated. The auxiliary electric drive assembly 380 includes a stationary housing 382 supporting a stationary electric motor 384 such as an alternating current induction motor. The output of the electric motor 384 is provided to a sun gear 386 which forms a portion of a planetary gear speed reduction assembly 388. The sun gear 386 drives a planet gear 390 which is coupled to a smaller planet gear 392 which engages a stationary ring gear 394. The ring gear 394 is coupled to the housing 382 and is therefore stationary. The carrier 396 provides an output to a quill 398 which drives a conventional caged differential assembly 400. The caged differential assembly 400 includes a pair of idler bevel gears 402 which cooperatively engage a pair of side bevel gears 404 which respectively drive left and right output shafts 406 and 408.

Turning to FIG. 9D, an additional embodiment of an auxiliary electric drive assembly 410 according to the present invention is illustrated. The auxiliary electric drive assembly 410 includes a stationary housing 412 which supports an electric motor 414 such as an alternating current induction motor. An output of the motor 414 drives a sun gear 416 which in turn drives planet gears 418. The planet gears 418 are coupled to additional planet gears 420 which engage a stationary ring gear 422. A carrier 424, which supports the planet gears 420 and 418, provides an output to a caged differential assembly 426. The caged differential assembly 426 includes a pair of idler bevel gears 428 which cooperatively engage a pair of side bevel gears 432. The side bevel gears 432 respectively drive left and right output shafts 434 and 436.

The foregoing disclosure is the best mode devised by the inventors for practicing this invention. It is apparent, however, that apparatus incorporating modifications and variations will be obvious to one skilled in the art of motor vehicle electric drive assemblies. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. An auxiliary electric drive assembly for a motor vehicle comprising, in combination:
    an electric motor having an output;
    a planetary gear speed reduction assembly having an input engaged with and driven by said output of said motor, a plurality of planet gears, a carrier supporting said planet gears and being rotatable about said output of said motor, and a reduced speed output, said input being said carrier of said planetary gear speed reduction assembly; and
    a differential assembly having an input member driven by said reduced speed output of said planetary gear assembly, and having a first output member and a second output member, each of said first and second output members adapted to drive a tire and wheel assembly.

2. The auxiliary electric drive assembly of claim 1 wherein said electric motor is an alternating current induction motor.

3. The auxiliary electric drive assembly of claim 1 wherein said planetary gear speed reduction assembly includes an input sun gear and said electric motor output drives said sun gear.

4. The auxiliary electric drive assembly of claim 1 further including a clutch disposed across two of said members of said differential assembly.

5. The auxiliary electric drive assembly of claim 4 wherein said friction clutch includes an electromagnetic coil and a ball ramp operator.

6. The auxiliary electric drive assembly of claim 1 utilized as one of a front axle in a rear wheel drive vehicle and a rear axle in a front wheel drive vehicle.

7. An auxiliary electric drive assembly for a motor vehicle comprising, in combination:
    an electric motor having an electrical input and a mechanical output;
    a planetary gear speed reduction assembly having an input engaged with and driven by said output of said electric motor, a plurality of planet gears commonly supported by a carrier, and a reduced speed output, said carrier being rotatable and being said input of said planetary gear speed reduction assembly;
    a differential assembly having an input member driven by said reduced speed output of said planetary gear assembly and having a first output member and a second output member; and
    a controller for receiving signals from sensors disposed on said motor vehicle and providing a drive signal to said electrical input of said electric motor.

8. The auxiliary electric drive assembly for a motor vehicle of claim 7 wherein said sensors include at least one of wheel speed sensors, a transmission gear sensor and throttle position sensor.

9. The auxiliary electric drive assembly for a motor vehicle of claim 7 wherein said sensors include wheel speed sensors, an engine speed sensor and a transmission gear sensor.

10. The auxiliary electric drive assembly of claim 7 wherein said electric motor is an alternating current induction motor.

11. The auxiliary electric drive assembly of claim 7 further including a clutch disposed across two of said members of said differential assembly.

12. The auxiliary electric drive assembly of claim 11 wherein said clutch includes an electromagnetic coil and a ball ramp operator.

13. The auxiliary electric drive assembly of claim 7 utilized as one of a front axle in a rear wheel drive vehicle and a rear axle in a front wheel drive vehicle.

14. An auxiliary electrical drive assembly for a motor vehicle comprising, in combination:
    an alternating current induction motor having an output;
    a planetary gear speed reduction assembly having an input engaged with and driven by said output of said motor, a plurality of planet gears commonly supported by a carrier, and a reduced speed output, said carrier being rotatable and being said input of said planetary gear speed reduction assembly; and
    a differential assembly having an input member driven by said reduced speed output of said planetary gear assembly and having a first output member and a second output member, each of said first and second output members adapted to drive a tire and wheel assembly.

15. The auxiliary electric drive assembly of claim 14 utilized as one of a front axle in a rear wheel drive vehicle and a rear axle in a front wheel drive vehicle.

16. The auxiliary electric drive assembly of claim 14 further including a clutch disposed across two of said members of said differential assembly.

17. The auxiliary electric drive assembly of claim 16 wherein said clutch includes an electromagnetic coil and a ball ramp operator.

18. The auxiliary electric drive assembly of claim 14 wherein said planetary gear speed reduction assembly includes an input sun gear and said induction motor output drives said sun gear.

* * * * *